United States Patent
Chang (10) Patent No.: US 7,855,504 B2
(45) Date of Patent: Dec. 21, 2010

(54) DISPLAY PANEL AND FABRICATING METHOD THEREOF

(75) Inventor: Hsi-Ming Chang, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 12/652,221

(22) Filed: Jan. 5, 2010

(65) Prior Publication Data

US 2010/0102717 A1  Apr. 29, 2010

Related U.S. Application Data

(62) Division of application No. 11/472,720, filed on Jun. 21, 2006, now Pat. No. 7,667,386.

(51) Int. Cl.
*H05B 33/02* (2006.01)
*H01L 51/00* (2006.01)

(52) U.S. Cl. .......... 313/504; 313/505; 313/512

(58) Field of Classification Search .......... 313/504, 313/505, 506, 509, 512; 315/169.3; 257/88, 257/99, 100; 445/24, 25; 438/99
See application file for complete search history.

(56) References Cited

U.S. PATENT DOCUMENTS

2005/0088081 A1* 4/2005 Nishikawa et al. .......... 313/504
2005/0116636 A1* 6/2005 Kang .......... 313/512
2005/0140290 A1* 6/2005 Park et al. .......... 313/512
2005/0253524 A1* 11/2005 Ishida .......... 313/634
2006/0055313 A1* 3/2006 Bae et al. .......... 313/500

* cited by examiner

*Primary Examiner*—David Nelms
*Assistant Examiner*—Tai Duong
(74) *Attorney, Agent, or Firm*—J.C. Patents (57) ABSTRACT

A fabricating method of display panel is provided. A first substrate having display area and non-display area is provided. A pixel array and a spacer layer are respectively formed in the display area and non-display area by forming many first strip electrodes parallel to each other and on the substrate, by forming an organic function layer on the substrate and covering the first strip electrodes, and by forming many second strip electrodes parallel to each other and on the organic function layer. An extension direction of the first strip electrodes is different to that of the second strip electrodes. The spacer layer surrounds the display area. A sealant is formed in the non-display area, and the spacer layer is disposed between the sealant and the pixel array. A second substrate is arranged above the first substrate, and the first substrate and the second substrate are fixed by using the sealant.

5 Claims, 13 Drawing Sheets

DISPLAY PANEL AND FABRICATING METHOD THEREOF

CROSS-REFERENCE TO RELATED APPLICATION

This application is a divisional application of and claims priority benefit of application Ser. No. 11/472,720, filed on Jun. 21, 2006, now allowed. The entirety of the above-mentioned patent application is hereby incorporated by reference herein and made a part of this specification.

BACKGROUND OF THE INVENTION

1. Field of Invention

The invention relates to a fabricating method of a display panel. More particularly, the invention relates to a fabricating method of a display panel, in which the sealant can be prevented from contaminating the devices in the display area.

2. Description of Related Art

Along with the rapid development of the multiple media industry, the technologies of semi-conductor device and display device also progress speedily. For the display device, as the organic electro-luminescence display (OELD) has advantages of large view-angle, low fabrication costs, quick response time, power-saving, suitable for the direct current drive of portable machines, wide working temperature range, lightweight, and miniaturized according to hardware requisites, the OELD meets the specification requirements of the display device in the multiple media times. Therefore, the OELD has great potentials to become the new flat panel display of the next generation.

Figure 1:
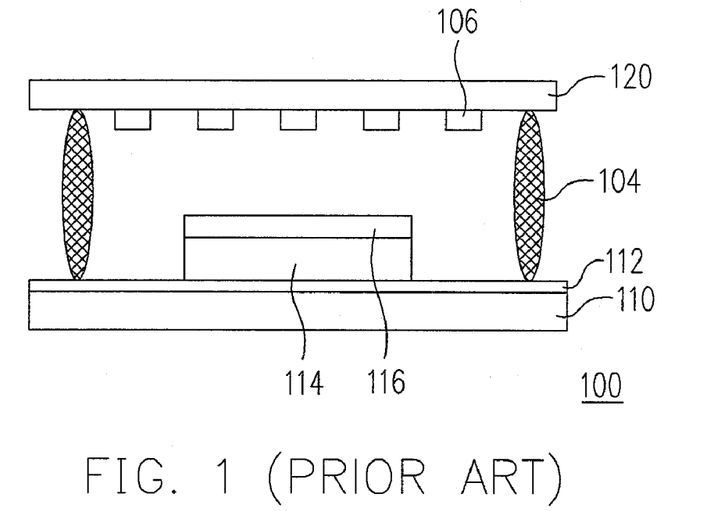
FIG. 1 is a schematic cross-sectional diagram of a conventional OELD panel.

FIG. 1 is a schematic cross-sectional diagram of a conventional OELD panel. Referring to FIG. 1, the OELD panel 100 mainly comprises a substrate 110, an anodic layer 112, an organic function layer 114, a cathode layer 116 and a substrate 120. The anodic layer 112, the organic function layer 114 and the cathode layer 116 are disposed on the substrate 110 in sequence. When the organic function layer 114 is exposed to vapor or oxygen, peeling off may occur at the interface between the anodic layer 112 and the cathode layer 116. Therefore, in the OELD panel 100, the substrate 110 and the substrate 120 are pressed and joined together using the sealant 104 made of epoxy resins, and the sealant 104 is solidified by ultraviolet radiation to seal the organic function layer 114 between the substrate 110 and the substrate 120. In addition, an absorbent material block 106 is formed on the substrate 120 to absorb the penetrated vapors.

Although the substrate 120 and the sealant 104 can prevent oxygen and vapor from penetrating into the OELD panel 100, excessive sealant 104 used for good sealing effect may overflow and contact the organic function layer 114 due to the uneven arrangement or bad control of the joint pressure of the sealant 104 when the substrate 120 joins with the substrate 110. Hence, the luminescent properties of the organic function layer 114 may be compromised.

In order to resolve the above problems, another conventional OELD panel is provided. As the OELD panel 200 shown in FIG. 2, a fillister 202 is formed on at least one of the anodic layers 222 on the upper substrate 210 and the lower substrate 220, and the fillister 202 is disposed between the sealant 204 and the organic function layer 224. Accordingly, when the sealant 204 would overflow in the joining process of the upper substrate 210 and the lower substrate 220, the excessive sealant 204a would flow into the fillister 202 and would not contact with the organic function layer 224.

Figure 2:
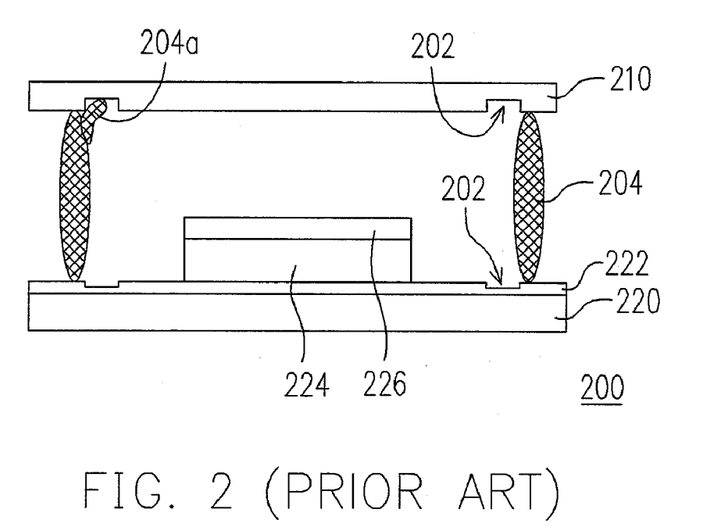
FIG. 2 is a schematic cross-sectional diagram of another conventional OELD panel.

It can be learned from the above that the fillister 202 must have enough room to hold the overflowed sealant 204a to prevent the sealant 204a from contacting with the organic function layer 224. Moreover, as the depth of the fillister 202 is limited by the thicknesses of the upper substrate 210 and the anodic layer 222, the area of the fillister 202 usually needs to be large. However, if the area of the fillister 202 is too large, the opening rate of the OELD panel 200 would be compromised.

SUMMARY OF THE INVENTION

Accordingly, the invention is directed to provide a fabricating method of a display panel, which can resolve the problem of the overflow sealant contaminating the internal devices inside the display area, with no extra fabrication cost.

The invention also provides a display panel with a spacer layer surrounding the display area for preventing the sealant from overflowing.

In order to achieve the above and other aspects, the invention provides a fabricating method of a display panel. A first substrate having a display area and a non-display area is provided; a pixel array is formed in the display area of the first substrate, and at the same time, a spacer layer is formed in the non-display area. The spacer layer surrounds the display area. A sealant is formed in the non-display area, and the spacer layer is disposed between the sealant and the pixel array. A second substrate is provided above the first substrate, and the first substrate and the second substrate are fixed by the sealant.

According to one embodiment of the invention, the formation method of the pixel array includes the following steps. For example, a plurality of scan lines, a plurality of data lines, and a plurality of active devices are formed on the substrate, and the scan lines and the data lines define a plurality of pixel areas on the substrate, and each active device is disposed in the corresponding pixel area and electrically connected with the corresponding scan line and data line. A pixel electrode is formed in each pixel area and electrically connected with the active device. An organic function layer is formed on the pixel electrodes and a common electrode is formed on the organic function layer.

According to one embodiment of the invention, the active devices are, for example, thin film transistors.

According to one embodiment of the invention, the formation method of the pixel array includes the following steps. For example, a plurality of first strip electrodes is formed on the substrate and parallel to each other, and an organic function layer is formed on the substrate. The organic function layer covers the first strip electrodes. A plurality of second strip electrodes is formed on the organic function layer and parallel to each other, and the first strip electrodes and the second strip electrodes have different extension directions.

According to one embodiment of the invention, the spacer layer is formed with other layers in at least one of the processes of forming the pixel array.

According to one embodiment of the invention, the formation method of the organic function layer includes the following steps. For example, a hole transmission layer is formed on the pixel electrode, and a luminescent layer is formed on the hole transmission layer. Then, an hole transmission layer is formed on the luminescent layer.

According to one embodiment of the invention, the fabricating method of display panel further includes forming a liquid crystal layer in the display area after the sealant is formed and before the first substrate is joined with the second substrate.

Accordingly, the invention provides a display panel, comprising: a first substrate having a non-display area and a display area that includes a pixel array, a spacer layer in the non-display area, a second substrate disposed opposite to the first substrate and a sealant. The spacer layer is disposed between the sealant and the pixel array and surrounds the display area. The sealant is disposed between the first and second substrates and in the non-display area of the first substrate.

The pixel array comprises a plurality of scan lines and a plurality of data lines and a plurality of active devices on the substrate on the substrate, a plurality of pixel electrodes, an organic function layer and a common electrode. The scan lines and the data lines define a plurality of pixel areas on the substrate. Each of the active devices is disposed in each of the pixel areas and electrically connected with the corresponding scan line and data line, and each of the pixel electrodes in each of the pixel areas to be electrically connected with the active device.

According to one embodiment of this invention, a material of the spacer layer is the same as a material of one selected from the group consisting of the scan line, the data line, the active device, the pixel electrode, the organic function layer and the common electrode. Alternatively, a material of the spacer layer is comprised of materials of two or more selected from the group consisting of the scan line, the data line, the active device, the pixel electrode, the organic function layer and the common electrode.

According to one embodiment of this invention, the organic function layer comprises a hole transmission layer on the pixel electrode, a luminescent layer on the hole transmission layer and an electron transmission layer on the luminescent layer.

According to one embodiment of this invention, a liquid crystal layer between the first substrate is further included.

According to one embodiment of the invention, the second substrate is a color filter (CF).

According to one embodiment of the invention, the thickness of the sealant is, for example, between 4 microns and 10 microns.

According to one embodiment of the invention, the thickness of the spacer layer is, for example, between 1 micron and 6 microns.

During the process of forming the pixel array, the spacer layer, capable of blocking off the overflow sealant, is formed in the non-display area of the display panel. That is, the invention can prevent the overflow sealant from contaminating the pixel array in the display area of the display panel.

In order to the make the aforementioned and other objects, features and advantages of the invention comprehensible, an embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 3A:
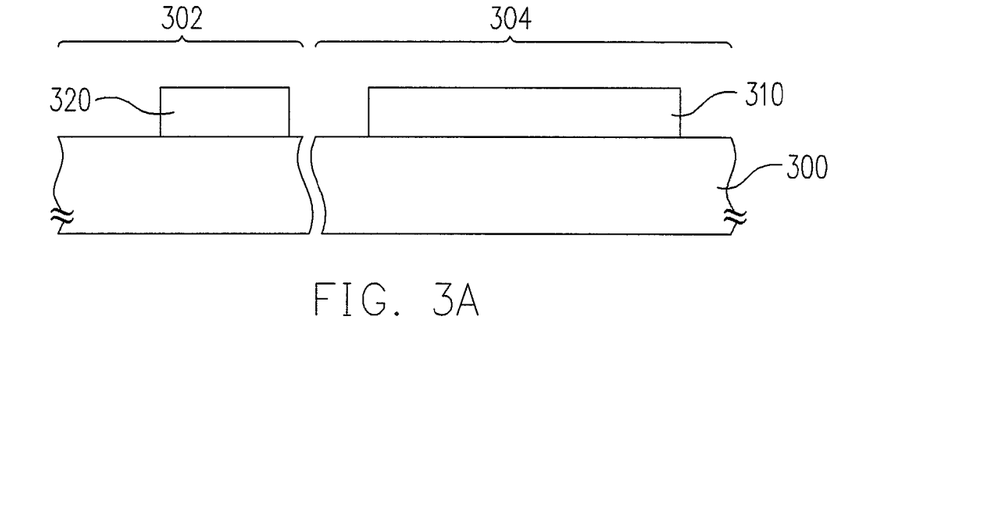
FIG. 3A to FIG. 3C are cross-sectional views of the process steps for the fabrication process of the display panel according to one embodiment of the invention.
Figure 3B:
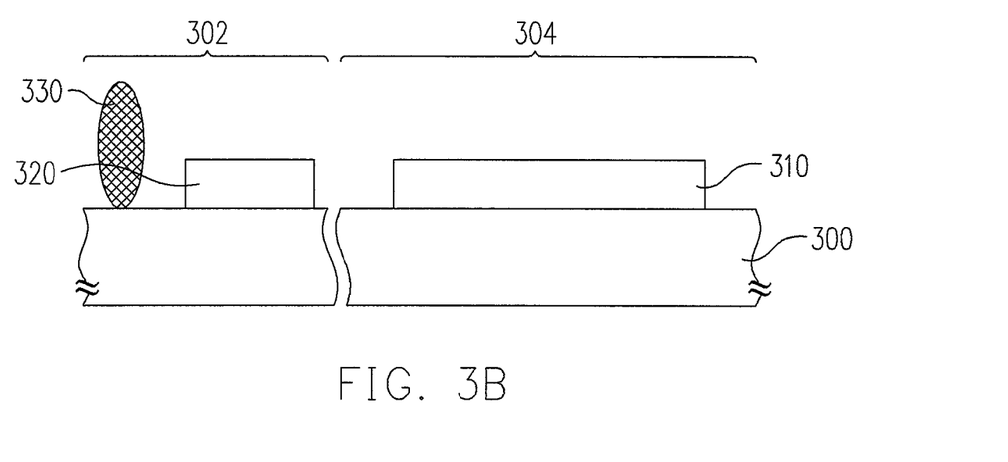
Figure 3C:
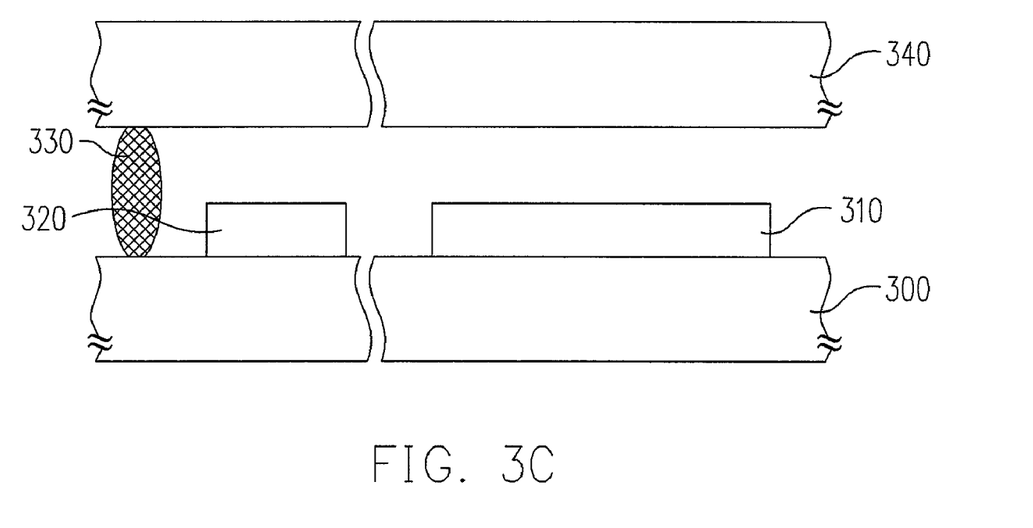

FIG. 3A to FIG. 3C are cross-sectional views of the process steps of the fabrication process of the display panel according to one embodiment of the invention. Referring to FIG. 3A, a pixel array 310 and a spacer layer 320 are formed on a first substrate 300 simultaneously. The first substrate 300 has a non-display area 302 and a display area 304. The pixel array 310 is formed in the display area 304, and the spacer layer 320 is formed in the non-display area 302 and surrounds the pixel array 310.

It is noted that, the fabrication process of the invention can be used to fabricate a liquid crystal display panel or an organic electro-luminescence display (OELD) panel. Those skilled in the art should know that the devices constituting the pixel array for different kinds of display panel are different. The following will describe the process steps of forming the pixel array 310 for the fabricating process of the liquid crystal display panel and OELD panel.

Figure 4A:
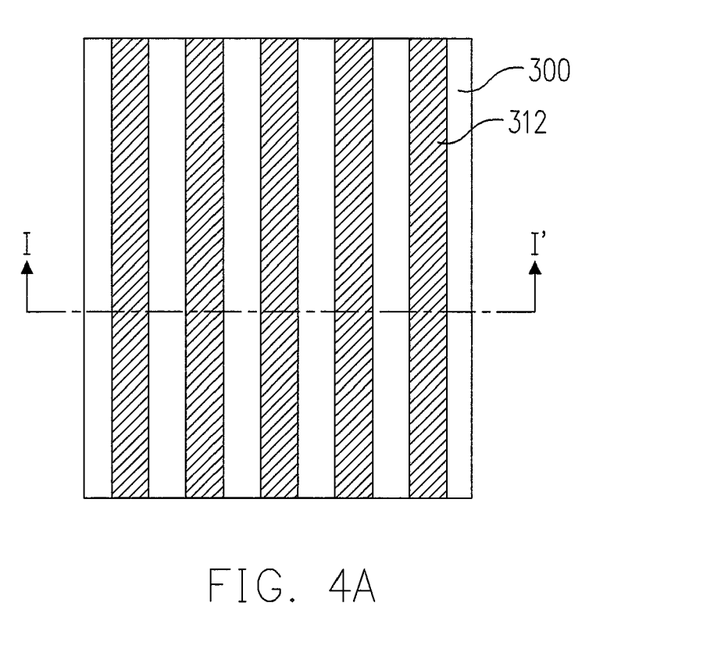
FIG. 4A to FIG. 4C are top views of the process steps for the fabrication process of the pixel array according to a first embodiment of the invention.
Figure 4B:
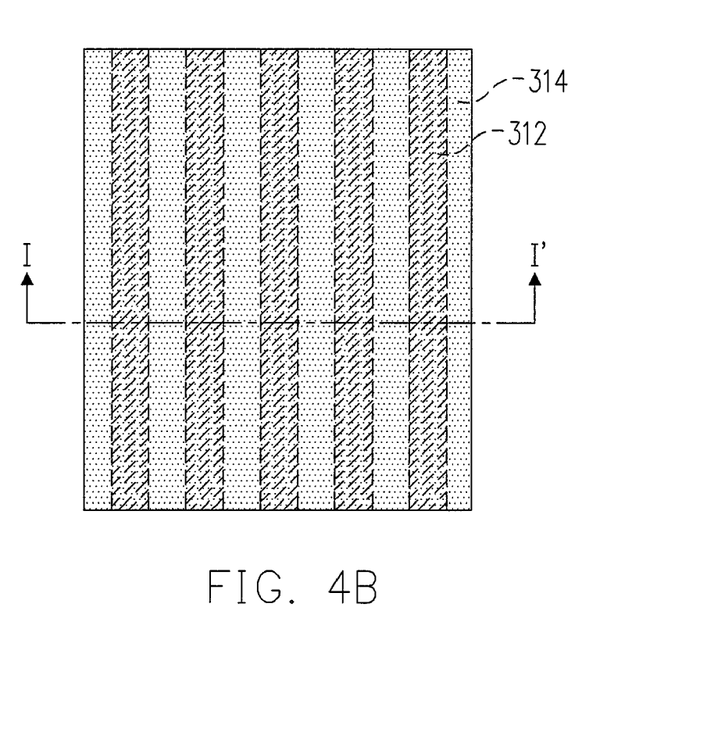
Figure 4C:
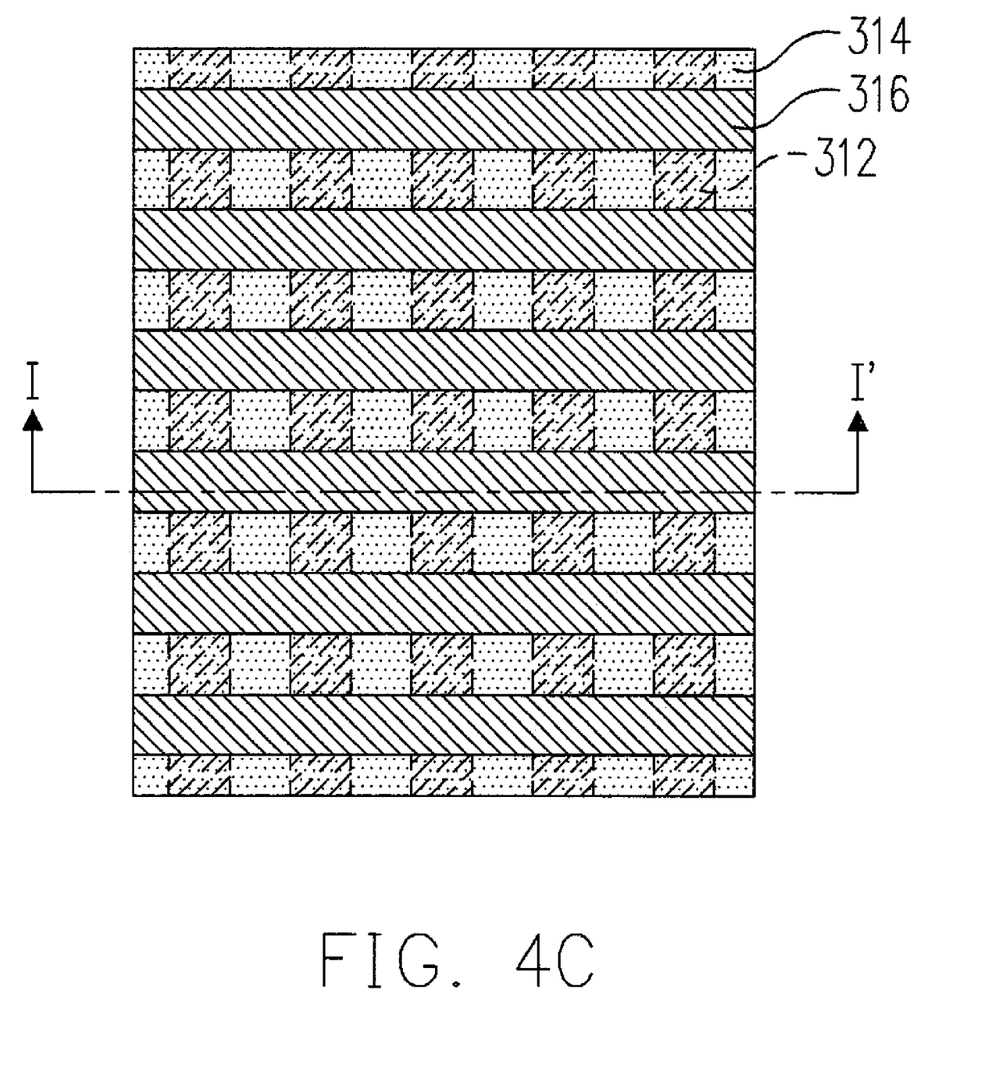
Figure 5A:
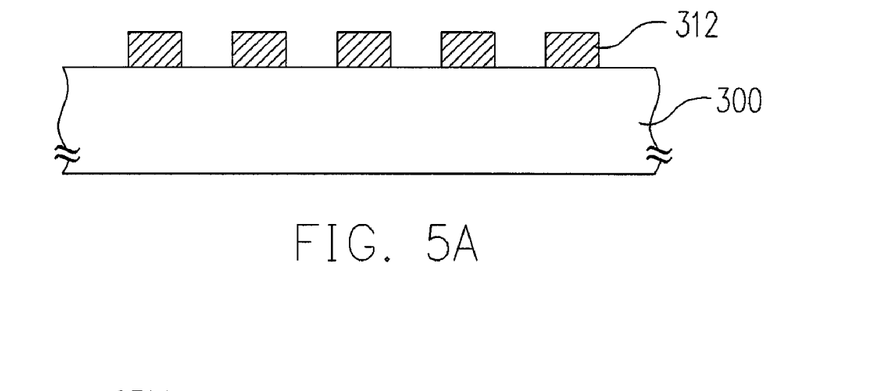
FIG. 5A to FIG. 5C are schematic cross-sectional views of the structures in FIG. 4A to FIG. 4C along the line I-I'.
Figure 5B:
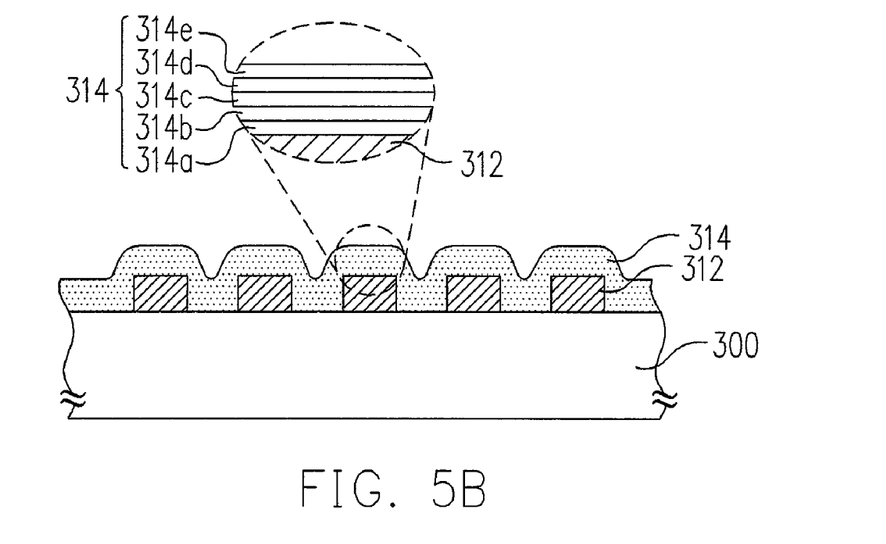
Figure 5C:
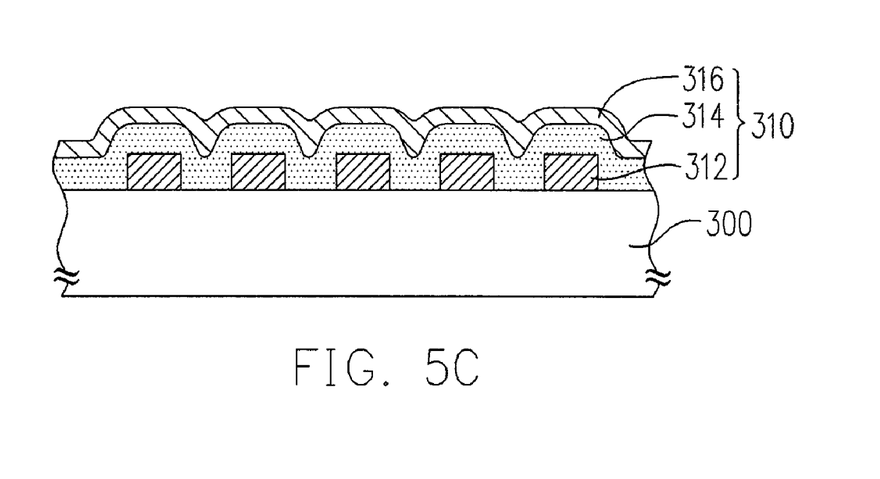

FIG. 4A to FIG. 4C are top views of the process steps for the fabrication process of the pixel array according to a first embodiment of the invention. FIG. 5A to FIG. 5C are schematic cross-sectional views of the structures in FIG. 4A to FIG. 4C along line I-I'. Referring to FIG. 4A and FIG. 5A, a plurality of first strip electrodes 312 is formed in the display area 304 of the first substrate 300, and these first strip electrodes 312 are disposed on the first substrate 300 and parallel to each other. In addition, the material of the first strip electrodes 312 may be a metal material or a transparent conductive material, depending on the type of the OELD panel to be fabricated is the bottom emission type or top emission type.

Next, referring to FIG. 4B and FIG. 5B, an organic function layer 314 is formed in the display area 304 of the first substrate and covers the first strip electrode 312. Wherein, the formation method of the organic function layer 314 includes, for example, evaporation, spin coating, ink jet printing, transfer or printing.

As shown in FIG. 5B, the organic function layer 314 comprises, for example, a hole injecting layer (HIL) 314a, a hole transmission layer (HTL) 314b, an emission layer (EL) 314c, an electron transmission layer (ETL) 314d and an electron injecting layer (EIL) 314e stacked in sequence. However, in other embodiments of the invention, the organic function layer 314 can also be the structure of a single layer (that is, an bipolar emission layer), dual layers (the hole transmission layer (HTL) 314b and the emission layer (EL) 314c with electron transmission properties) or triple layers (the hole transmission layer (HTL) 314b, the emission layer (EL) 314c, and the electron transmission layer (ETL) 314d). Those skilled in the art should know that, the number of the stacked layers constituting the organic function layer 314 depends on the energy distribution conditions of the material of each layer. Therefore, the number of the stack layers constituting the organic function layer 314 is not limited to the embodiments by the invention, but depends on the design requirement of actual devices.

Next, referring to FIG. 4C and FIG. 5C, a plurality of second strip electrodes 316 parallel to each other is formed on the organic function layer 314. The extension direction of the first strip electrode 312 and the extension direction of the second strip electrode 316 are different. In general, the extension direction of the first strip electrode 312 is perpendicular to that of the second strip electrode 316. Of course, the second strip electrode layer 316 can also be made of a metal material or a transparent conductive material. After the second strip electrodes 316 are formed, the fabrication process of the pixel array 310 is almost completed. It can be learned that, the display panel to be formed by the invention is the passive OELD panel.

The spacer layer 320 as shown in FIG. 3A can be formed in the non-display area 302 along with other layers in at least one of the processes of forming the first strip electrode 312, the organic function layer 314, and the second strip electrode 316. That is, the spacer layer 320 may be a single layer made of the same material as one of the first strip electrode 312, the organic function layer 314 and the second strip electrode 316, or can also be a composite layer composed of more than two stacked layers of the above three layers.

Figure 6A:
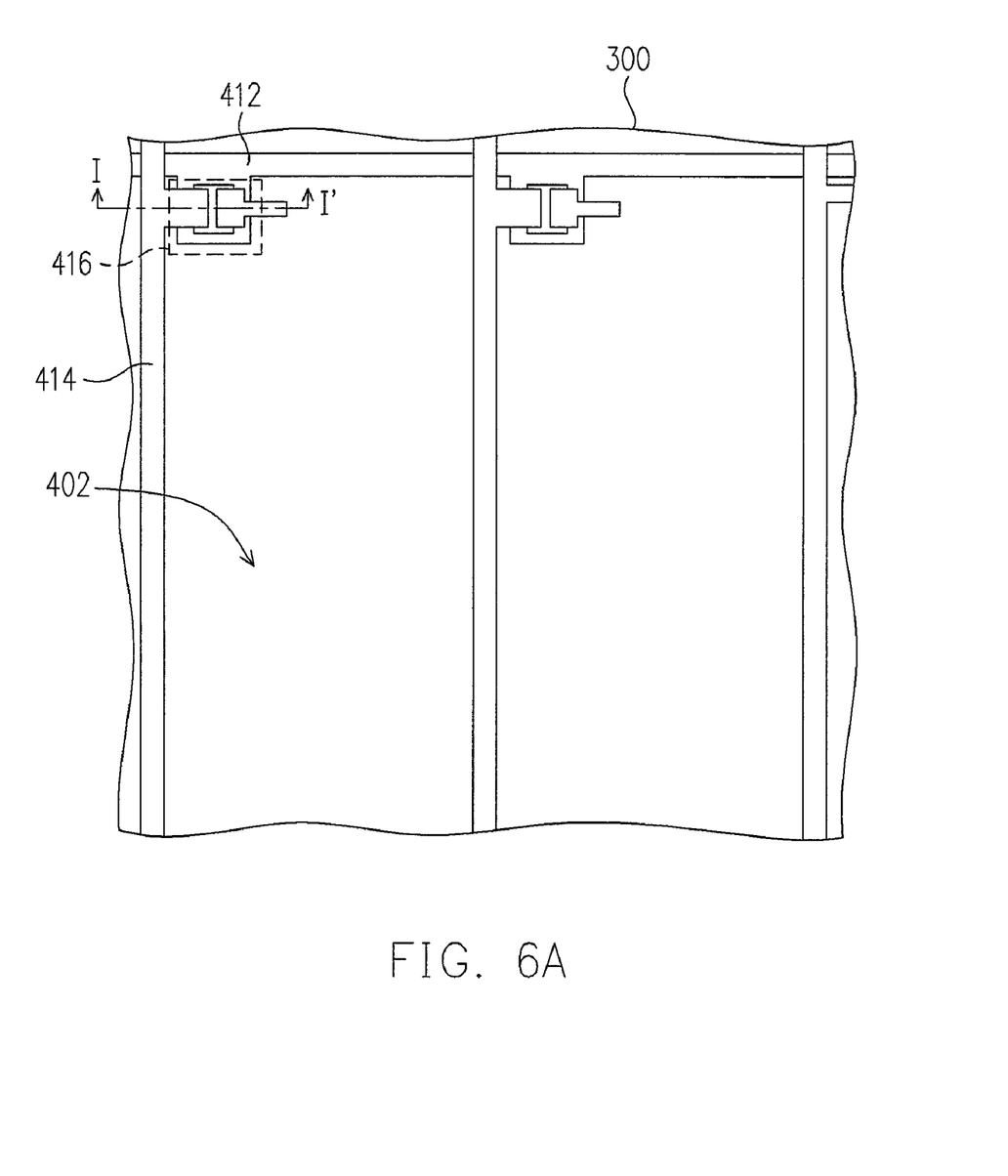
FIG. 6A to FIG. 6C are top views of the process steps for the fabrication process of the pixel array according to a second embodiment of the invention.
Figure 6B:
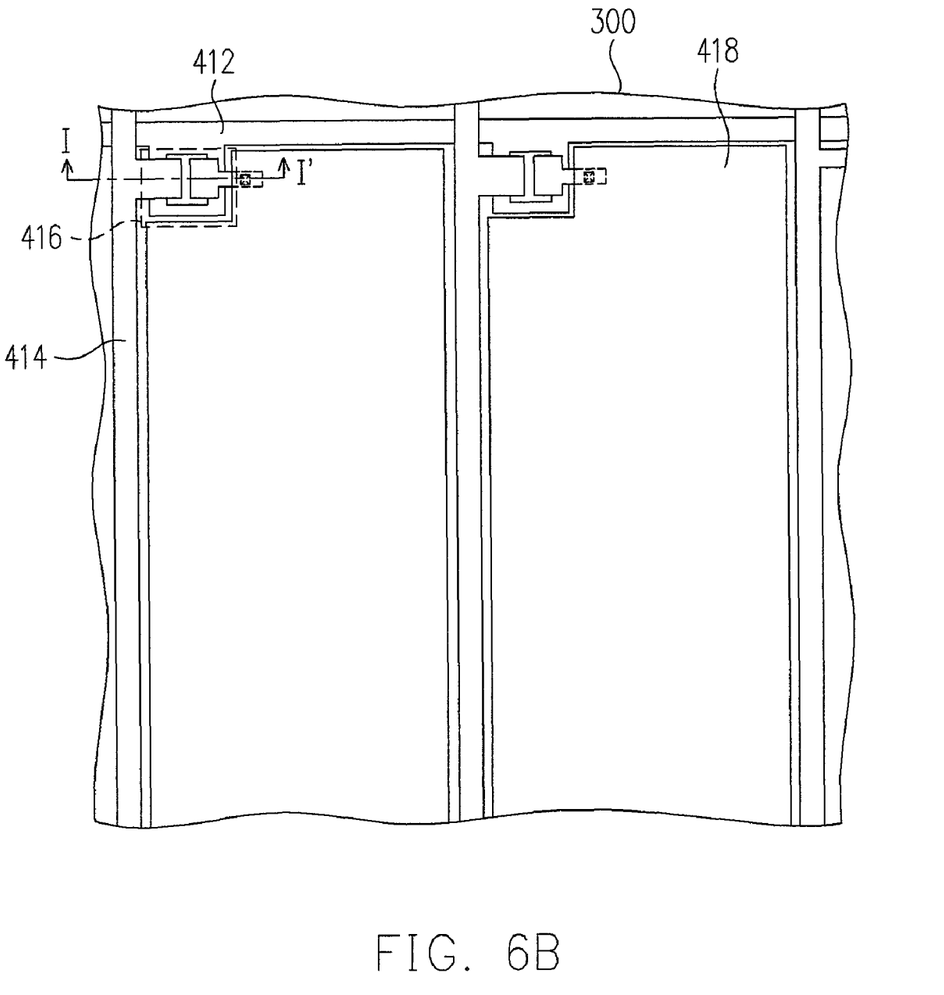
Figure 6C:
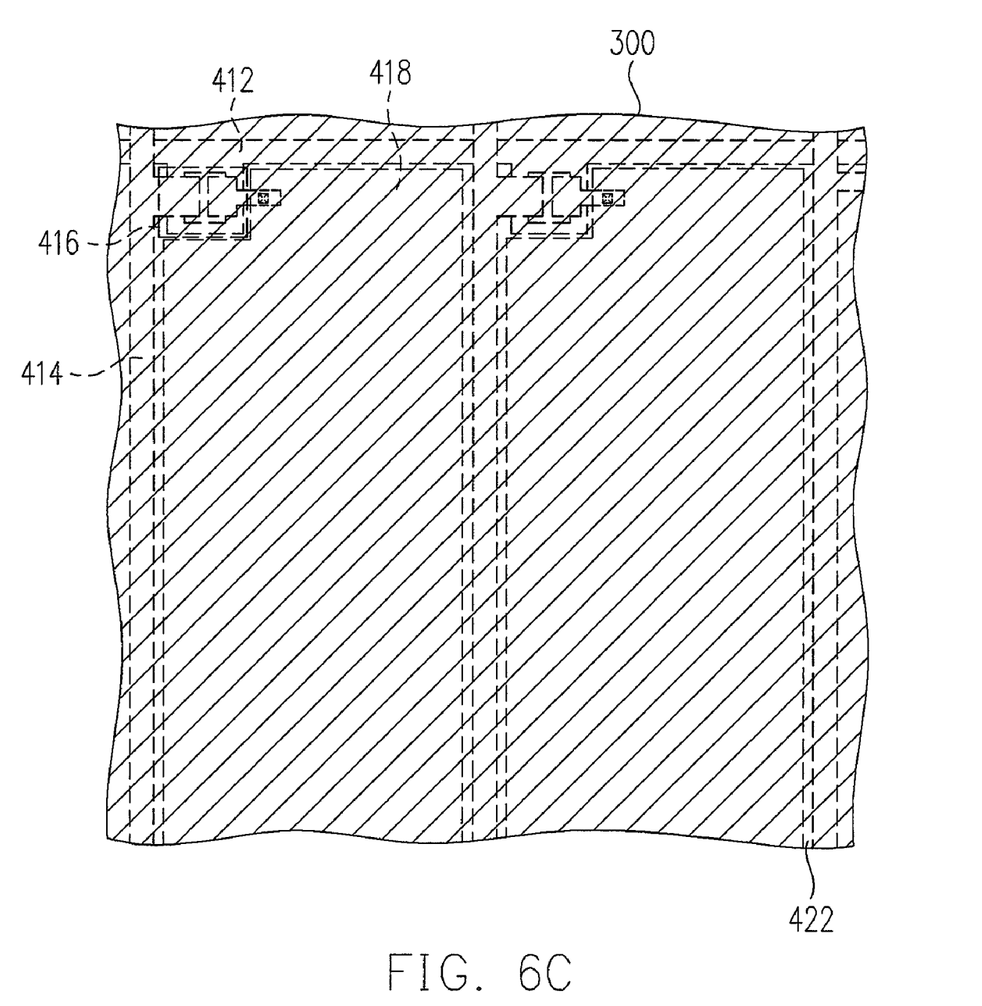
Figure 7A:
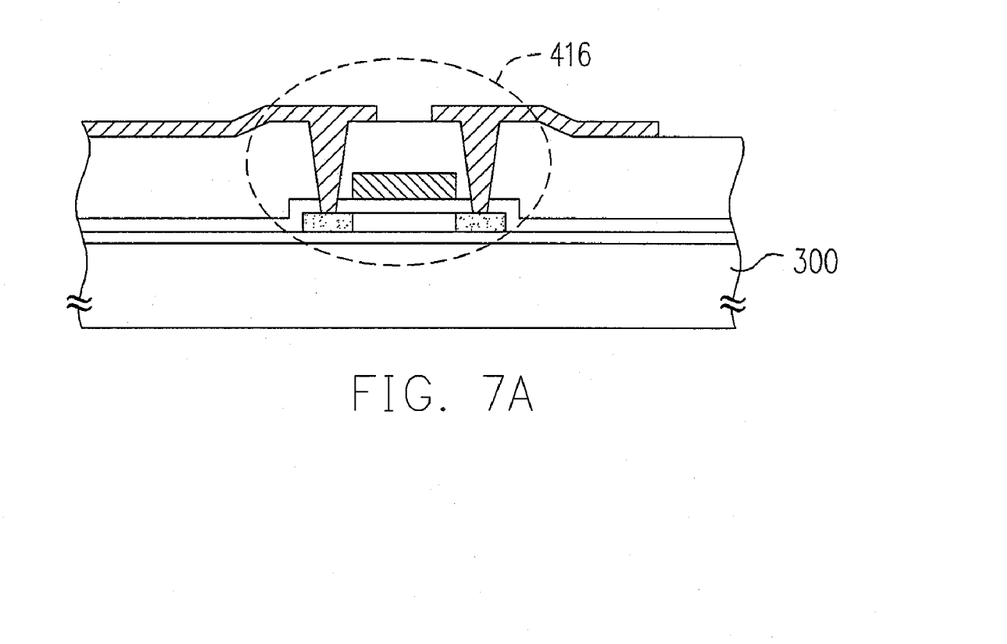
FIG. 7A to FIG. 7C are schematic cross-sectional views of the structures in FIG. 6A to FIG. 6C along the line I-I'.
Figure 7B:
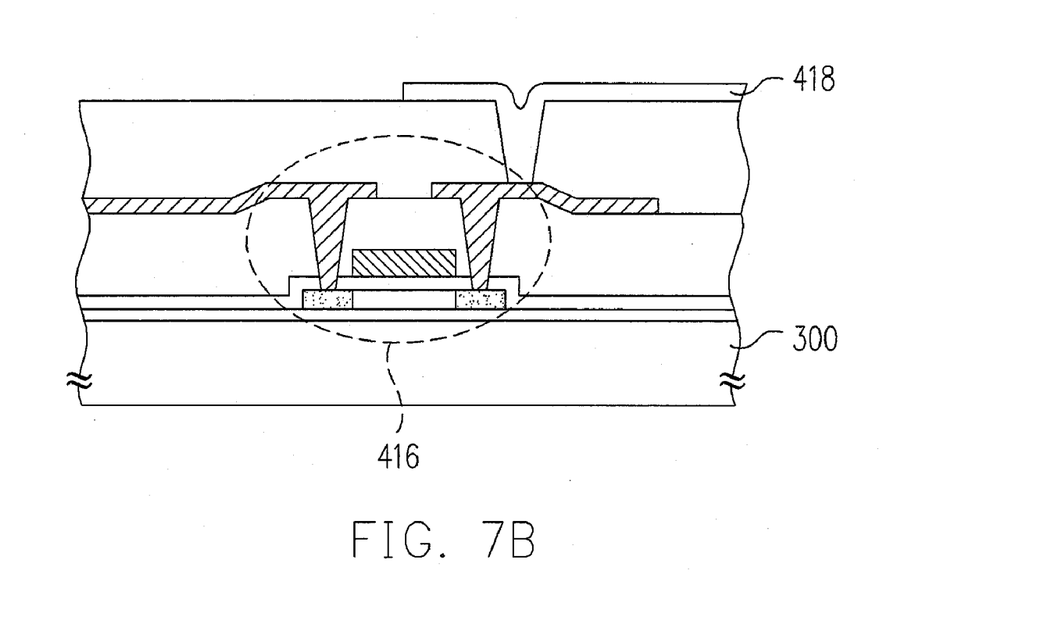
Figure 7C:
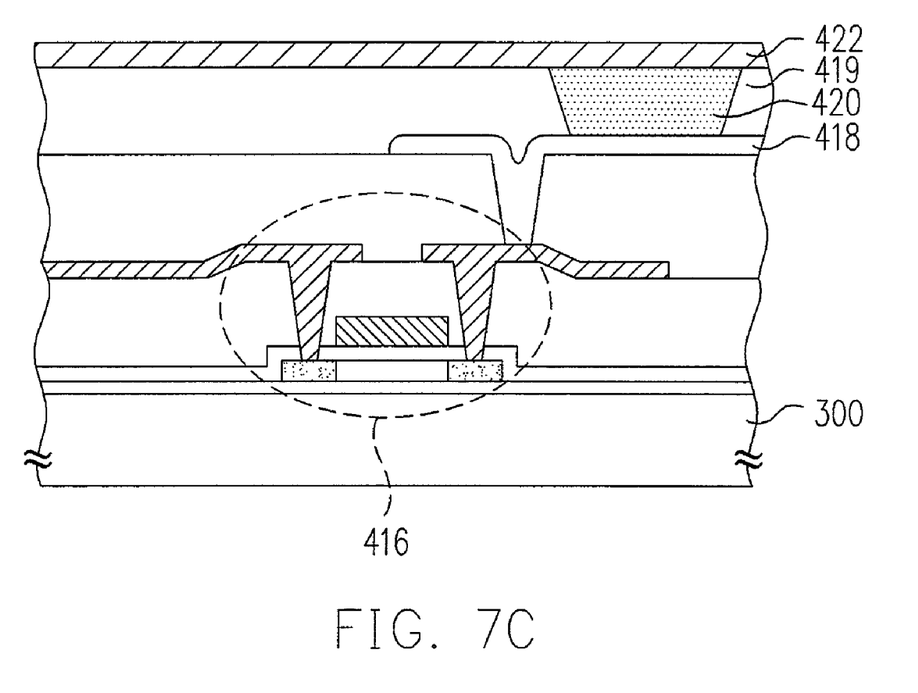

Of course, in another embodiment, the method of the invention can also be used to fabricate the active OELD panel. FIG. 6A to FIG. 6C are top views of the process steps of the fabricating processes of the pixel array according to a second embodiment of the invention. FIG. 7A to FIG. 7C are the schematic cross-sectional views of the structures in FIG. 6A to FIG. 6C along the line I-I'. Referring to FIG. 6A and FIG. 7A, in the embodiment, the formation method of the pixel array 310 in FIG. 3C includes: a plurality of scan lines 412, data lines 414, for example, and a plurality of active devices 416 is formed in the display area 304 on the first substrate 300. The scan lines 412 and the data lines 414 define a plurality of pixel areas 402 on the first substrate 300, and the active devices 416 are respectively disposed in the pixel area 402, and electrically connected with the corresponding scan line 412 and data line 414. In the present embodiment, the active devices 416 are, for example, thin film transistors. In details, the active device 416 may be the low temperature poly-silicon thin film transistor (LTPS-TFT) or amorphous thin film transistor (a-TFT). The detailed fabrication processes of the two thin film transistors are familiar to those skilled in the art, and will not be described in details herein. In addition, although the active device 416 shown in FIG. 6A is a top gate thin film transistor (top gate TFT), the invention is not limited by the embodiment. The active device of the invention can also be a bottom gate TFT.

Referring to FIG. 6B and FIG. 7B, the pixel electrode 418 is formed in each pixel area 402. In each pixel area 402, the pixel electrode 418 is electrically connected with the active device 416. Next, referring to FIG. 6C and FIG. 7C, an organic function layer 420 is formed on the pixel electrode 418, and a common electrode 422 is formed on the organic function layer 420. Those skilled in the art should know that, before the organic function layer 420 is formed, a pixel define layer (PDL) 419 is first formed on the substrate to isolate the organic function layer 420 in each pixel area 402.

In addition, the organic function layer 420 is similar to the organic function layer 314 (see FIG. 4B) of the previous embodiment, which can also be a single layer, or the stacked structure of dual layers, triple layers or multiple layers. The descriptions of the film layers constituting the organic function layer 420 are omitted here.

Also, the spacer layer 320 as shown in FIG. 3A can be formed in the non-display area 302 along with other layers in at least one of the processes of forming the scan lines 412, the data lines 414, the active devices 416, the pixel electrode 418, the organic function layer 420 and the common electrode 422. That is, the spacer layer 320 may be a single layer made of the same material as one of the scan lines 412, the data lines 414, the active devices 416, the pixel electrode 418, the organic function layer 420 and the common electrode 422, or can also be a composite layer composed of more than two layers of these film layers.

Referring to FIG. 3B, after the pixel array 310 and the spacer layer 320 are formed, the sealant 330 is then formed in the non-display area 302. The spacer layer 320 is disposed between the sealant 330 and the pixel array 310 so as to block the overflowed sealant and to prevent it from contacting with the pixel array 310 when the sealant 330 overflows. Accordingly, the organic function layer (the organic function layer 314 shown in FIG. 4C and the organic function layer 420 shown in FIG. 6C) can be avoided to be contaminated by the overflowed sealant.

The invention does not limit the number of the layers constituting the spacer layer 320, as long as the thickness of the spacer layer 320 is large enough to block off the overflowed sealant. For example, the thickness of the sealant 330 is between about 4 micron and 10 micron, and, in the second embodiment of the invention, if the spacer layer 320 is formed along with the formation of the active device 416, the thickness of the spacer layer 320 is between about 1 micron and 6 microns. For example, if the active device 416 is an a-TFT, and the thickness of the active device 416 is between 1 micron and 2 microns, the thickness of the spacer layer 320 formed along is also between 1micron and 2 microns. On the contrary, if the active device 416 is a LTPS-TFT, the thickness of the spacer layer 320 formed along is between 3 microns and 6 microns.

Referring to FIG. 3C, a second substrate 340 is disposed above the first substrate 300. The first substrate 300 and the second substrate 340 are pressed and joined so that the second substrate 340 contacts with the sealant 330. Next, the sealant 330 is solidified, and the relative positions of the first substrate 300 and the second substrate 340 are fixed by the solidified sealant 330. Now, the fabricating process of the OELD panel is almost completed.

In particular, in the process of pressing and joining the first substrate 300 and the second substrate 340, even the sealant overflows due to the excessive sealant 330 used, the spacer layer 320 between the pixel array 310 and the sealant 330 can block the overflowed sealant to avoid the contamination for the pixel array 310 (especially for the organic function layer).

It is remarkable that, in the fabricating process of the liquid crystal display panel, if the un-solidified sealant contacts with the liquid crystal molecules, the properties of the liquid crystal molecules may be compromised. Therefore, the method provided by the invention is also suitable to fabricate liquid crystal display panels. The following will describe the fabricating method of a liquid crystal display panel according to the invention.

FIG. 8A to FIG. 8D are the cross-sectional views of the process steps of the fabricating process of the liquid crystal display panel according to one embodiment of the invention.

Figure 8A:
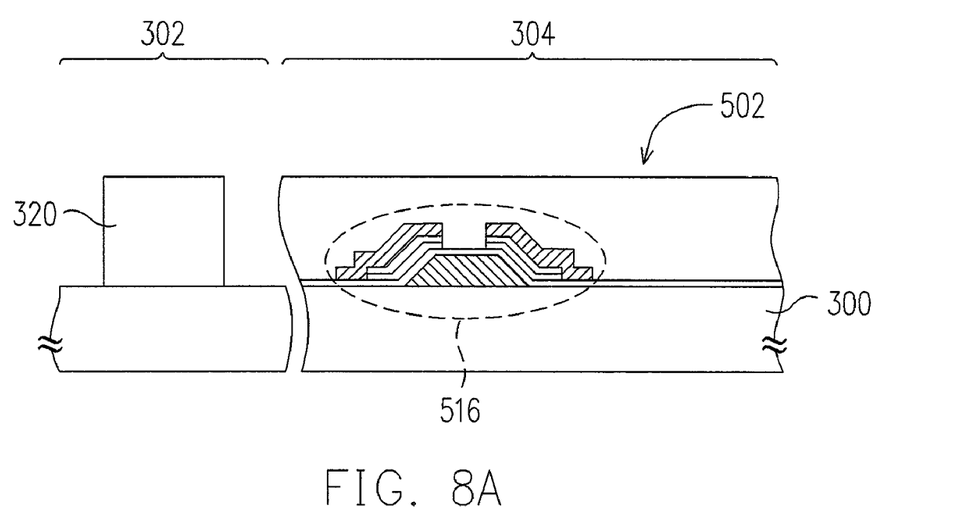
FIG. 8A to FIG. 8D are cross-sectional views of the process steps for the fabrication process of the liquid crystal display panel according to one embodiment of the invention.

Referring to FIG. 8A, the fabricating method for the active matrix LCD (AM-LCD) panel is similar as the abovementioned active OELD panel. At first, a pixel array is formed in the display area 304 on the first substrate 300, and the spacer layer 320 is formed in the non-display area 302 at the same time. In the embodiment, the formation method of the pixel array includes: for example, forming a plurality of scan lines (not shown), data lines (not shown), and a plurality of active devices 516 on the first substrate 300, and the connection relations being the same as the abovementioned scan lines 412, data lines 414 and active devices 416. Also, the scan lines and the data lines define a plurality of pixel areas 502 on the first substrate 300. And, the active devices 516 can also be LTPS-TFT or a-TFT. Of course, the thin film transistor may be a top gate TFT or a bottom gate TFT.

Figure 8B:
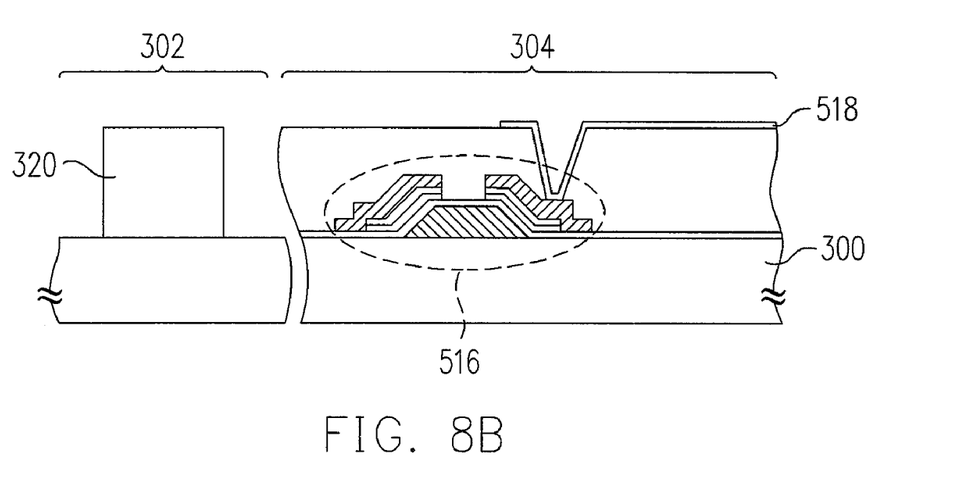

Referring to FIG. 8B, a pixel electrode 518 is formed in each pixel area 502. In each pixel area 502, the pixel electrode 518 is electrically connected with the active device 516. Also, the spacer layer 320 in the embodiment can be formed in the non-display area 302 on the first substrate 300 along with other layers in at least one of the processes of forming the pixel array.

Figure 8C:
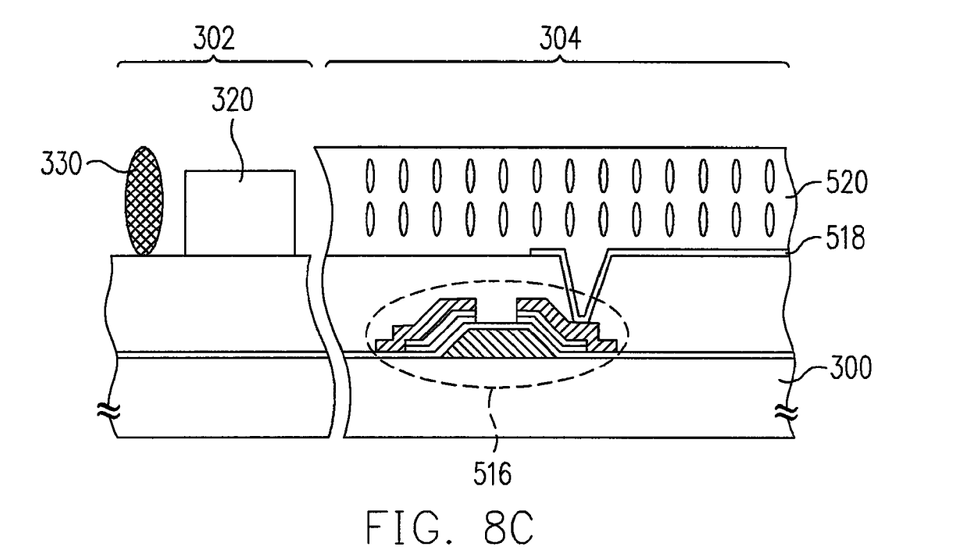
Figure 8D:
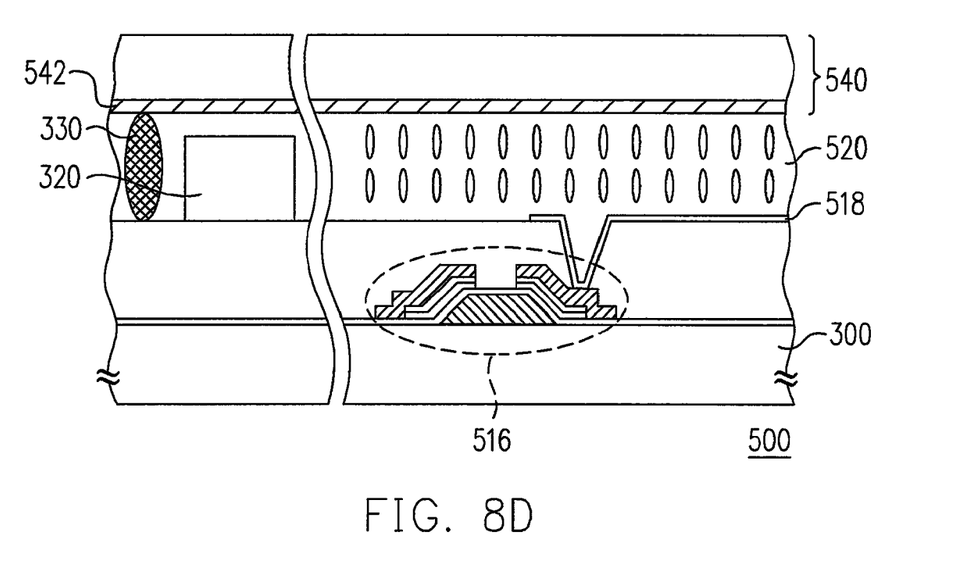

Referring to FIG. 8C, as described in the abovementioned embodiment, the sealant 330 is formed in the non-display area 302 on the first substrate 300, and the liquid crystal layer 520 is then formed in the display area 304. Thereafter, as shown in FIG. 8D, the processes of pressing and joining the substrates and solidifying the sealant are performed to assemble and join the first substrate 300 and the second substrate 540. Accordingly, the fabricating process of the liquid crystal display panel 500 is almost completed. The second substrate 540 is, for example, a color filter including a common electrode 542.

In summary, according to the invention, a spacer layer is simultaneously formed between the sealant and the pixel array during the fabricating process for each film layer of the display panel, so that the overflow sealant can be avoided to contaminate the liquid crystal layer or the organic function layer in the display area. The fabricating process or method of the display panel according to the invention can prevent the overflowed sealant from adversely affecting the devices.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display panel, comprising:
    a first substrate, wherein the first substrate has a display area and a non-display area and the display area has a pixel array, wherein the pixel array comprises:
    a plurality of first strip electrodes parallel to each other and on the substrate;
    an organic function layer on the substrate and covering the first strip electrodes; and
    a plurality of second strip electrodes parallel to each other and on the organic function layer, wherein an extension direction of the first strip electrodes is different to that of the second strip electrodes;
    a spacer layer in the non-display area, wherein the spacer layer surrounds the display area, a material of the spacer layer comprises at least one materials selected from the group consisting of the first strip electrodes, the organic function layer and the second strip electrodes;
    a second substrate disposed opposite to the first substrate; and
    a sealant between the first and second substrates and in the non-display area of the first substrate, wherein the spacer layer is disposed between the sealant and the pixel array.

2. The panel as claimed in claim 1, wherein a material of the spacer layer is a material selected from the group consisting of the first strip electrodes, the organic function layer and the second strip electrodes.

3. The panel as claimed in claim 1, wherein the organic function layer comprises:
    a hole transmission layer on the substrate, and the hole transmission layer covers the first strip electrodes;
    a luminescent layer on the hole transmission layer; and
    an electron transmission layer on the luminescent layer.

4. A fabricating method of a display panel, comprising:
    providing a first substrate, wherein the first substrate has a display area and a non-display area;
    forming a pixel array in the display area, and forming a spacer layer in the non-display area, wherein the spacer layer surrounds the display area, the spacer layer is formed simultaneously in at least one of the steps of the formation method of the pixel array, and the formation method of the pixel array comprises:
    forming a plurality of first strip electrodes parallel to each other and on the substrate;
    forming an organic function layer on the substrate and covering the first strip electrodes; and
    forming a plurality of second strip electrodes parallel to each other and on the organic function layer, wherein an extension direction of the first strip electrodes is different to that of the second strip electrodes;
    forming a sealant in the non-display area, wherein the spacer layer is disposed between the sealant and the pixel array;
    providing a second substrate; and
    assembling the second substrate and the first substrate, wherein the first substrate and the second substrate are fixed by the sealant.

5. The fabricating method as claimed in claim 4, wherein the formation method of the organic function layer comprises:
    forming a hole transmission layer on the substrate, and the hole transmission layer covers the first strip electrodes;
    forming a luminescent layer on the hole transmission layer; and
    forming an electron transmission layer on the luminescent layer.

* * * * *